(12) United States Patent
Yamaguchi et al.

(10) Patent No.: US 8,936,317 B2
(45) Date of Patent: Jan. 20, 2015

(54) SEAT BACK FOR VEHICLE AND SEAT FOR VEHICLE INCLUDING THE SAME

(75) Inventors: Hiroyoshi Yamaguchi, Yokohama (JP); Makoto Hasegawa, Yokohama (JP)

(73) Assignee: NHK Spring Co., Ltd., Yokohama-shi (JP)

( * ) Notice: Subject to any disclaimer, the term of this patent is extended or adjusted under 35 U.S.C. 154(b) by 670 days.

(21) Appl. No.: 13/070,994

(22) Filed: Mar. 24, 2011

(65) Prior Publication Data

US 2011/0241403 A1    Oct. 6, 2011

(30) Foreign Application Priority Data

Mar. 30, 2010    (JP) .................... 2010-079473

(51) Int. Cl.
| | |
|---|---|
| *B60N 2/66* | (2006.01) |
| *B60N 2/42* | (2006.01) |
| *B60N 2/427* | (2006.01) |
| *B60N 2/64* | (2006.01) |
| *B60N 2/68* | (2006.01) |
| *B60N 2/72* | (2006.01) |

(52) U.S. Cl.
CPC ............... *B60N 2/66* (2013.01); *B60N 2/4228* (2013.01); *B60N 2/42745* (2013.01); *B60N 2/643* (2013.01); *B60N 2/682* (2013.01); *B60N 2/686* (2013.01); *B60N 2/72* (2013.01)
USPC .................. 297/452.31; 297/452.36

(58) Field of Classification Search
CPC ............. B60N 2/66; B60N 2/686; A47C 7/46
USPC ................ 297/452.31, 452.36, 284.4
See application file for complete search history.

(56) References Cited

U.S. PATENT DOCUMENTS

| | | | | |
|---|---|---|---|---|
| 3,512,835 | A * | 5/1970 | Flototto .................... | 297/452.31 |
| 5,044,693 | A * | 9/1991 | Yokota ........................ | 297/284.4 |
| 7,237,847 | B2 * | 7/2007 | Hancock et al. ........ | 297/284.4 X |
| 7,575,278 | B2 | 8/2009 | Wissner et al. | |
| 8,113,582 | B2 * | 2/2012 | Liu ............................. | 297/284.4 |

(Continued)

FOREIGN PATENT DOCUMENTS

| | | |
|---|---|---|
| JP | U-02-149545 | 12/1990 |
| JP | A-2000-210157 | 8/2000 |

(Continued)

OTHER PUBLICATIONS

Oct. 29, 2013 Office Action issued in Japanese Patent Application No. 2010-079473 (with translation).

(Continued)

*Primary Examiner* — Anthony D Barfield
(74) *Attorney, Agent, or Firm* — Oliff PLC

(57) ABSTRACT

A waist receiving portion, which is provided at a support member, is curved to form a convex shape toward a front side in a seat front and rear direction in side view. Accordingly, when a waist portion of an occupant is pressed against the waist receiving portion, the change of the shape of lumbar vertebrae is suppressed. For this reason, since it is possible to reduce the difference between a timing when a head portion of the occupant is pressed against a headrest and a timing when a neck portion of the occupant is pressed against a neck receiving portion, it is possible to suppress swing of the head portion of the occupant about the neck portion as a fulcrum in the seat front and rear direction. Therefore, a burden to the neck portion of the occupant is reduced.

10 Claims, 13 Drawing Sheets

(56) References Cited

U.S. PATENT DOCUMENTS

| | | | |
|---|---|---|---|
| 8,226,165 B2 * | 7/2012 | Mizoi | 297/284.4 X |
| 2005/0179290 A1 | 8/2005 | Hancock et al. | |

FOREIGN PATENT DOCUMENTS

| | | |
|---|---|---|
| JP | A-2005-126053 | 5/2005 |
| JP | A-2007-091175 | 4/2007 |
| JP | A-2007-186103 | 7/2007 |
| JP | A-2009-101137 | 5/2009 |
| WO | WO 2007/145262 | 12/2007 |

OTHER PUBLICATIONS

Jul. 22, 2014 Office Action issued in Chinese Patent Application No. 201110081803.0 (with translation).

* cited by examiner

SEAT BACK FOR VEHICLE AND SEAT FOR VEHICLE INCLUDING THE SAME

CROSS-REFERENCE TO RELATED APPLICATION

This application claims priority under 35 USC 119 from Japanese Patent Application No. 2010-079473 filed Mar. 30, 2010, the disclosure of which is incorporated by reference herein.

BACKGROUND OF THE INVENTION

1. Field of the Invention

The invention relates to a seat back for a vehicle and a seat for a vehicle including the seat back for a vehicle.

2. Related Art

A seat back, which includes a seat back frame and a plate body mounted on the seat back frame and supporting a back portion of an occupant seated in a seat for vehicle, is known as a seat back of a seat for vehicle (for example, Japanese Patent Application Laid-Open (JP-A) No. 2009-101137). An opening, which extends in a height direction of the seat back, is formed at the plate body disclosed in JP-A No. 2009-101137. The opening is formed at a position that corresponds to thoracic vertebrae of an occupant seated in the seat for vehicle. When a back portion of an occupant is pressed against the plate body, due to the opening, a reaction force applied to the thoracic vertebrae of the occupant is reduced. Accordingly, the occupant feels more comfortable to sit on the seat for vehicle.

Meanwhile, for example, in the seat back disclosed in JP-A No. 2009-101137, if a vehicle is collided by another vehicle or the like from the vehicle rear side (collided from behind) and a load having a predetermined value or more such as a force of inertia is applied to an occupant, the waist portion of the occupant is pressed against the plate body. In general, the lumbar vertebrae of the occupant seated in the seat for vehicle are gently curved. Accordingly, if the waist portion of an occupant is pressed against the plate body, the lumbar vertebrae of the occupant are stretched upward so as to have the shape of a straight line. For this reason, the head portion of the occupant is moved relative to a headrest toward the seat height direction upper side. If the position of the head portion of the occupant is changed as described above, a timing when the head portion of the occupant is pressed against the headrest and a timing when the neck portion of the occupant is pressed against the plate body become different from each other. This causes the head portion of the occupant to swing about the neck portion as a fulcrum in the seat front and rear direction.

SUMMARY OF THE INVENTION

The invention has been made in consideration of the above-mentioned fact, and an object of the invention is to obtain a seat back for a vehicle that suppresses the change of the shape of lumbar vertebrae of an occupant, and a seat for a vehicle including the seat back for a vehicle.

A seat back for a vehicle according to a first aspect includes: a seat back frame including a pair of seat back side frame portions, the seat back side frame portions being disposed respectively at both sides in a seat width direction and each of the seat back side frame portions extending in a seat height direction, and a seat back upper frame portion which connects upper end portions of the pair of seat back side frame portions along the seat width direction and on which a headrest is mounted; a support member that is mounted on the seat back frame; and a waist receiving portion that is provided at the support member, the waist receiving portion being curved to form a convex shape (protruding in swell manner) toward a front side in a seat front-rear direction in side view, and supporting a waist portion of an occupant when a load having a predetermined value or more is applied to the occupant toward a rear side in the seat front-rear direction.

According to the first aspect of the invention, when a load having a predetermined value or more is applied to an occupant toward the rear side in the seat front and rear direction at the time of collision, the waist portion of the occupant is pressed against a waist receiving portion. Here, the waist receiving portion is curved to form a convex shape toward the front side in the seat front and rear direction in side view. Accordingly, the concentration of a pressing force as a reaction force (hereinafter, referred to as a "pressing reaction force") to a specific portion of the lumbar vertebrae of the occupant is suppressed, so that a burden to the waist portion of the occupant is reduced. Further, since the waist portion of the occupant is held (restrained) on the waist receiving portion in a state where the lumbar vertebrae are curved, the change of the shape of the lumbar vertebrae is suppressed.

In general, the lumbar vertebrae of an occupant seated in a seat for vehicle are curved. When the curvature of the lumbar vertebrae is changed and the shape of the lumbar vertebrae is changed, the position of the head portion of the occupant is changed. In particular, if the curvature of the lumbar vertebrae is increased and the shape of the lumbar vertebrae is changed to a linear shape, the head portion of the occupant is moved significantly relative to the headrest toward the upper side in the seat height direction. If the position of the head portion of the occupant is changed as described above, a timing when the head portion of the occupant is pressed against the headrest and a timing when a neck portion (neck lower portion) of the occupant is pressed against the support member become different from each other. This causes the head portion of the occupant to swing about the neck portion as a fulcrum in the seat front and rear direction.

In contrast, in the invention, as described above, the lumbar vertebrae of the occupant are held (restrained) by the waist receiving portion in a state of being curved. For this reason, the change of the shape of the lumbar vertebrae is suppressed. Accordingly, the relative position of the headrest and the support member is adjusted so that the difference between a timing when the head portion of the occupant is pressed against the headrest and a timing when the neck portion of the occupant is pressed against a neck receiving portion (neck lower receiving portion) is reduced. As a result, the swing of the head portion of the occupant about the neck portion as a fulcrum in the seat front and rear direction is suppressed. In particular, by that the relative position of the headrest and the neck receiving portion is adjusted so that the head portion and the neck portion of the occupant are simultaneously pressed against the headrest and the support member, it is possible to suppress the swing of the head portion of the occupant in the seat front and rear direction. Accordingly, a burden to the neck portion of the occupant is reduced.

The seat back for a vehicle according to a second aspect, in the seat back for a vehicle according to the first aspect, further includes a chest receiving portion that is provided at the support member, the chest receiving portion being curved to form a convex shape (protruding in swell manner) toward the rear side in the seat front-rear direction in side view, and supporting a chest portion of an occupant when a load having a predetermined value or more is applied to the occupant toward the rear side in the seat front-rear direction.

According to the second aspect of the invention, when a load having a predetermined value or more is applied to an occupant toward the rear side in the seat front and rear direction at the time of collision, the chest portion of the occupant is pressed against a chest receiving portion provided at the support member. Here, the chest receiving portion is curved to form a convex shape toward the rear side in the seat front and rear direction in side view. Accordingly, the concentration of a pressing reaction force on a specific portion of the thoracic vertebrae of the occupant is suppressed, so that a burden to the chest portion of the occupant is reduced.

Further, since the chest portion of the occupant is held (restrained) on the chest receiving portion in a state where the thoracic vertebrae are curved, the change of the shape of the thoracic vertebrae is suppressed. For this reason, since the movement of the head portion of the occupant toward the upper side in the seat height direction is further suppressed, it is possible to reduce the difference between a timing when the head portion of the occupant is pressed against the headrest and a timing when the neck portion of the occupant is pressed against the support member. Accordingly, a burden applied to the neck portion of the occupant is reduced.

The seat back for a vehicle according to a third aspect, in the seat back for a vehicle according to the first or second aspect, further includes a neck receiving portion (neck lower receiving portion) that is provided at the support member, the neck receiving portion being arranged at the front side in the seat front-rear direction of the seat back upper frame portion, and supporting a neck portion (neck lower portion) of an occupant when a load having a predetermined value or more is applied to the occupant toward the rear side in the seat front-rear direction.

According to the third aspect of the invention, when a load having a predetermined value or more is applied to an occupant toward the rear side in the seat front and rear direction at the time of collision, the neck portion of the occupant is pressed against the neck receiving portion disposed at the front side in the seat front and rear direction of the seat back upper frame portion. Accordingly, for example, the neck receiving portion comes into surface contact with the neck portion of the occupant, so that the contact area between the neck portion of the occupant and the neck receiving portion is increased. Therefore, a load applied to the occupant is transmitted in distribute-manner to the neck receiving portion, so that surface pressure is reduced. For this reason, a pressing reaction force applied to the neck portion of the occupant is reduced. Therefore, a burden to the neck portion of the occupant is reduced.

According to a fourth aspect of the seat back for a vehicle, in the seat back for a vehicle according to the third aspect, the neck receiving portion is curved to form a convex shape (protruding in swell manner) toward the front side in the seat front-rear direction in side view.

According to the fourth aspect of the invention, the neck receiving portion is curved to form a convex shape toward the front side in the seat front and rear direction in side view. Accordingly, when the neck portion of the occupant is pressed against the neck receiving portion, the concentration of a pressing reaction force to a specific portion of the cervical vertebrae of the occupant is suppressed. Therefore, a burden to the neck portion of the occupant is reduced.

According to a fifth aspect of the seat back for a vehicle, in the seat back for a vehicle according to any one of the first to fourth aspects, the waist receiving portion includes a concave portion which is recessed toward the rear side in the seat front-rear direction from the waist receiving portion, a lumbar vertebrae of the occupant being disposed in the concave portion when a load having a predetermined value or more is applied to the occupant toward the rear side in the seat front-rear direction.

According to the fifth aspect of the invention, when a load having a predetermined value or more is applied to the occupant toward the rear side in the seat front and rear direction at the time of collision and the waist portion of the occupant is pressed against the waist receiving portion, the lumbar vertebrae of the occupant are disposed in the concave portion formed at the waist receiving portion. Accordingly, since a pressing reaction force to the lumbar vertebrae of the occupant is reduced, the change of the shape of the lumbar vertebrae is further suppressed and a burden to the waist portion of the occupant is reduced.

According to a sixth aspect of the seat back for a vehicle, in the seat back for a vehicle according to any one of the first to fourth aspects, a cross-section of the waist receiving portion when seen from the seat height direction has a corrugated shape.

According to the sixth aspect of the invention, the cross-section of the waist receiving portion seen in the seat height direction has a corrugated shape. Accordingly, the rigidity of the waist receiving portion is larger than that of other portions. Here, since the rigidity of the waist receiving portion is increased by the mechanical property caused by a corrugated shape, it is possible to reduce material costs as compared to a structure where the thickness or the like of the waist receiving portion is increased.

Further, in the seat back for a vehicle according to any one of the first to sixth aspects, it is possible that the seat back for a vehicle further includes shoulder receiving portions that are provided at the support member, the shoulder receiving portions being arranged respectively at both sides in the seat width direction of the chest receiving portion and also at the front side in the seat front-rear direction of the chest receiving portion, and the shoulder receiving portions supporting shoulder portions of the occupant when a load having a predetermined value or more is applied to the occupant toward the rear side in the seat front-rear direction.

Further, in the seat back for a vehicle according to any one of the first to sixth aspects, it is possible that a shock absorber is provided between the neck receiving portion and the seat back upper frame portion.

Further, in the seat back for a vehicle according to any one of the first to sixth aspects, it is possible that the support member configures a pair of wire members each extending in a sheet height direction.

A seat for vehicle according to a seventh aspect includes: a seat cushion; the seat back for a vehicle of any one of the first to sixth aspects that is mounted on an end portion at the rear side in a seat front and rear direction of the seat cushion; and a headrest that is mounted on the seat back upper frame portion of the seat back for a vehicle.

According to the seventh aspect of the invention, the seat for vehicle includes the seat back for a vehicle according to any one of the first to sixth aspects of the invention. Accordingly, the change of the shape of the lumbar vertebrae is suppressed, so that it is possible to reduce a burden to the neck portion of the occupant.

As described above, a seat back for a vehicle and a seat for vehicle including the seat back for a vehicle according to the invention have an advantage capable of suppressing the change of the shape of the lumbar vertebrae of an occupant.

BRIEF DESCRIPTION OF THE DRAWINGS

Embodiments of the invention will be described in detail with reference to the following figures, wherein.

DETAILED DESCRIPTION OF THE INVENTION

Seat for vehicles according to exemplary embodiments of the invention will be described below with reference to the drawings. Meanwhile, arrows X, Y, and Z shown in each drawing represent the front side in the seat front and rear direction, the outer side in the seat width direction, and the upper side in the seat height direction of a seat for vehicle according to each exemplary embodiment.

The structure of a seat for vehicle 10 according to a first exemplary embodiment will be described first.

Figure 1:
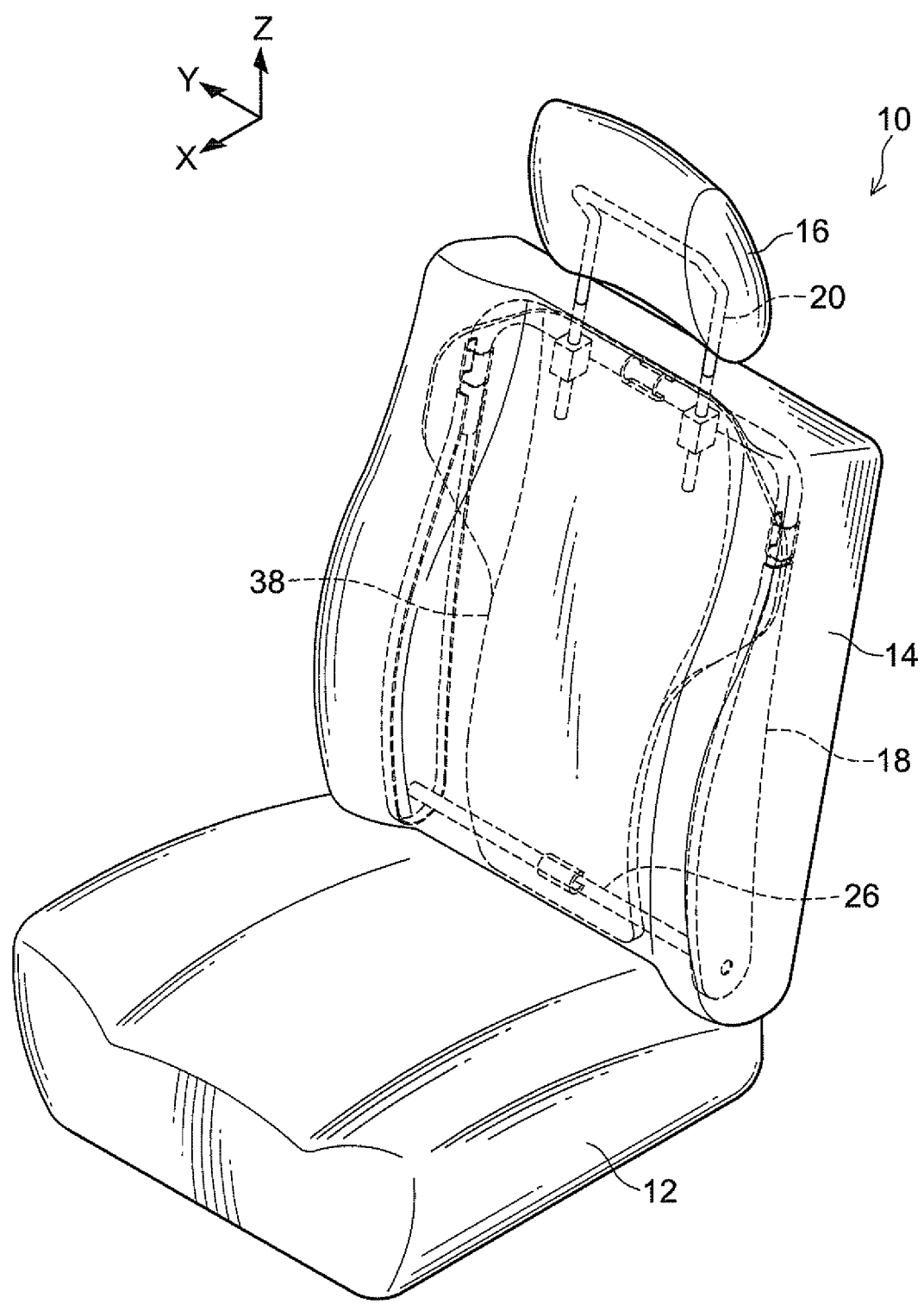
FIG. 1 is a perspective view of a seat for a vehicle according to a first exemplary embodiment of the invention.

The seat for vehicle 10 is shown in FIG. 1. The seat for vehicle 10 is applied to, for example, a front seat and the like of a vehicle. The seat for vehicle 10 includes a seat cushion 12 on which an occupant is seated, a seat back 14 that is tiltably provided at an end portion at the rear side in the seat front and rear direction of the seat cushion 12 and supports the back portion of the occupant, and a headrest 16 that is provided at the upper end portion of the seat back 14 and supports the head portion of the occupant.

The seat cushion 12, the seat back 14, and the headrest 16 are provided with a seat cushion frame (not show in the drawings), a seat back frame 18, and a headrest frame 20, which form the frameworks thereof, respectively. A cushion member covered with a seat cover which is not show in the drawings is supported by each of the seat cushion frame (not show in the drawings), the seat back frame 18, and the headrest frame 20.

Figure 2:
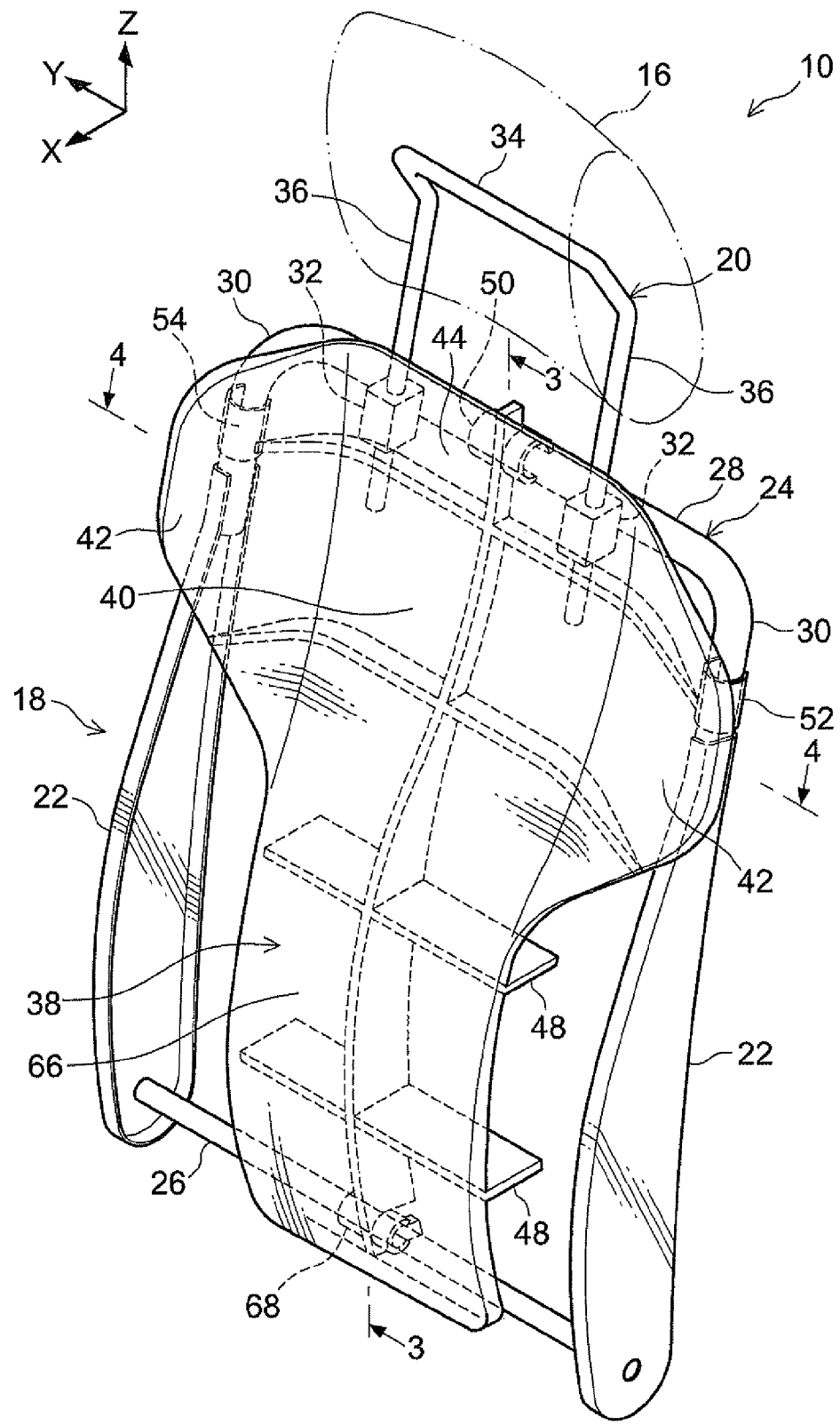
FIG. 2 is a perspective view of a seat back for a vehicle according to the first exemplary embodiment of the invention.

As shown in FIG. 2, the seat back frame 18 is formed in a frame shape as a whole. The seat back frame 18 includes a pair of seat back side frames (seat back side frame portions) 22 that is disposed on both sides in the seat width direction and extends in the seat height direction, a seat back upper frame 24 that connects the upper end portions of these seat back side frames 22 in the seat width direction, and a connecting rod 26 that is connected to the lower end portions of the seat back side frames 22.

The pair of seat back side frames 22 has a C-shaped cross-section, and is disposed so that an opening of the seat back side frame 22 faces the seat width direction inner side and the longitudinal direction of the seat back side frame 22 corresponds to the seat height direction. Accordingly, the pair of seat back side frames 22 forms the side portions of the seat back frame 18. The seat back upper frame 24 is formed by bending a steel pipe in a U shape. The seat back upper frame 24 includes a seat back upper frame portion 28 and side frame upper portions 30, and forms the upper portion of the seat back frame 18. The seat back upper frame portion 28 extends in the seat width direction. The side frame upper portions 30 extend toward the lower side in the seat height direction from end portions of the seat back upper frame portion 28 at the both sides in the seat width direction, and are connected to the upper end portions of the seat back side frames 22.

The seat back upper frame portion 28 is provided with a pair of brackets 32 on which a headrest frame 20 is mounted. These brackets 32 have a tube shape, and are disposed with a distance therebetween in the seat width direction so that the axial direction of the bracket corresponds to the seat height direction. The headrest frame 20 is formed by bending a steel pipe in a U shape, and includes a top frame portion 34 and side frame portions (headrest stays) 36. The top frame portion 34 extends in the seat width direction. The side frame portions (headrest stays) 36 extend toward the seat height direction lower side from end portions of the top frame portion 34 at the seat width direction both sides. Portions in the vicinity of end portions in the seat height direction at the upper side of the side frame portions 36 are inclined toward the front side in the seat front and rear direction. Portions in the vicinity of end portions in the seat height direction at the lower side of the side frame portions 36 are inserted into the brackets 32, respectively, and are connected to the brackets 32 at predetermined positions by stopper mechanisms (not show in the drawings). The positions where the side frame portions 36 are connected to the brackets 32 are changed by the stopper mechanisms, so that the positions of the headrest 16 in the seat height direction can be adjusted.

A support member 38 formed of a steel plate, a resin plate, or the like is mounted on the front side in the seat front and rear direction of the seat back frame 18. The support member 38 is disposed at a position facing the back portion of an occupant who is seated in the seat for vehicle 10 (see FIG. 1). Accordingly, when a load having a predetermined value or more is applied to the occupant, the back portion of the occupant is supported by the support member 38. Meanwhile, a flat mat (not show in the drawings) is provided on the front side in the seat front and rear direction of the support member 38. Further, an occupant described here corresponds to a person that has an average physique in a country, a region, or the like where the seat for vehicle 10 according to this exemplary embodiment is used.

Figure 3:
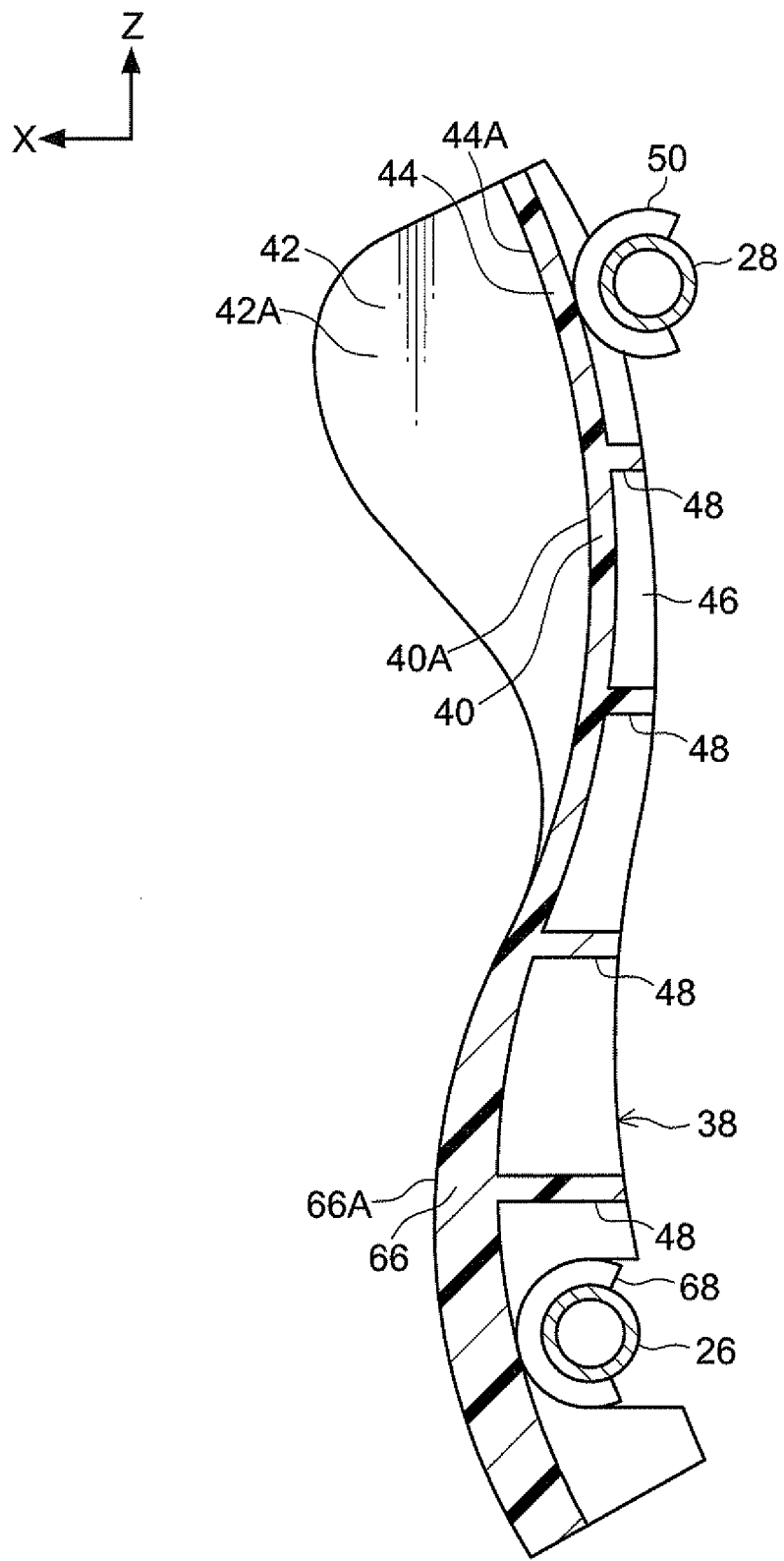
FIG. 3 is a cross-sectional view taken along a line 3-3 of FIG. 2.

The support member 38 includes a chest receiving portion 40, a pair of shoulder receiving portions 42, a neck receiving portion (neck lower receiving portion) 44, and a waist receiving portion 66. As shown in FIG. 3, the chest receiving portion 40 is provided at the seat width direction middle portion of the support member 38, and the surface (the front side surface in the seat front and rear direction) of the chest receiving portion 40 forms a pressure receiving surface 40A that supports a portion from the thoracic vertebrae to the shoulder blade of an occupant. The pressure receiving surface 40A is curved to form a convex shape toward the rear side in the seat front and rear direction in side view so as to correspond to the curved shape of the thoracic vertebrae of an occupant. Accordingly, when the chest portion of an occupant is pressed against the pressure receiving surface 40A, a pressing force as a reaction force (hereinafter, referred to as a "pressing reaction force") is not concentrated on a specific portion of the thoracic vertebrae. Meanwhile, the chest portion of an occupant corresponds to the thoracic vertebrae of the occupant and both (left and right) side portions of the thoracic vertebrae of the occupant.

The neck receiving portion 44 is provided on the seat height direction upper side of the chest receiving portion 40. The neck receiving portion 44 extends toward the seat height direction upper side from the chest receiving portion 40 so as to cover the seat back upper frame portion 28 (the neck receiving portion 44 is disposed between a neck portion (neck lower portion) of an occupant and the seat back upper frame portion 28), and the surface (the front side surface in the seat front and rear direction) of the neck receiving portion 44 forms a pressure receiving surface 44A that supports the neck portion of an occupant. Meanwhile, the neck portion of an occupant corresponds to the cervical vertebrae and portions around the cervical vertebrae.

Figure 4:
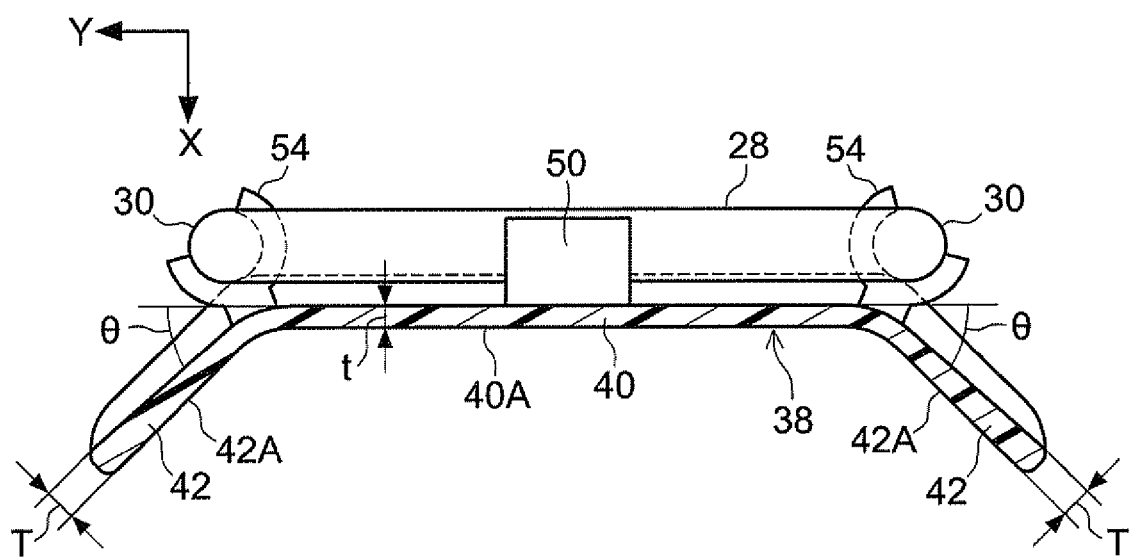
FIG. 4 is a cross-sectional view taken along a line 4-4 of FIG. 2.

As shown in FIG. 4, the shoulder receiving portions 42 are provided on the both sides in the seat width direction of the chest receiving portion 40, respectively. Each of the shoulder receiving portions 42 extends toward the seat width direction outer side from the chest receiving portion 40, is inclined with respect to the chest receiving portion 40 toward the front side in the seat front and rear direction by a predetermined inclination angle θ (θ>0 degree), and is disposed on the front side in the seat front and rear direction further than the seat back upper frame portion 28, the chest receiving portion 40, and the neck receiving portion 44. The surface (front side surface in the seat front and rear direction) of each of the shoulder receiving portions 42 forms a pressure receiving surface 42A that supports the shoulder portion of an occupant. Further, the thickness T of the shoulder receiving portion 42 is larger than the thickness t of the chest receiving portion 40, and the rigidity (stiffness) of the shoulder receiving portion 42 is higher than that of the chest receiving portion 40. Meanwhile, the shoulder portion of an occupant corresponds to a shoulder blade and a portion around the shoulder blade.

Furthermore, as shown in FIG. 3, the waist receiving portion 66 is provided on the seat height direction lower side of the chest receiving portion 40. The waist receiving portion 66 extends toward the seat height direction lower side from the chest receiving portion 40, and the surface (the front side surface in the seat front and rear direction) of the waist receiving portion 66 forms a pressure receiving surface 66A that supports the waist portion of an occupant. The pressure receiving surface 66A is curved to form a convex shape toward the front side in the seat front and rear direction in side view so as to correspond to the curved shape of the lumbar vertebrae of an occupant. Accordingly, when the waist portion of an occupant is pressed against the pressure receiving surface 66A, a pressing reaction force is not concentrated on a specific portion of the lumbar vertebrae. Moreover, the waist receiving portion 66 is thicker than the chest receiving portion 40, and the rigidity of the waist receiving portion 66 is higher than that of the chest receiving portion 40.

A vertical rib 46 extending in the seat height direction and plural horizontal ribs 48 extending in the seat width direction protrude from the back surface (the rear side surface in the seat front and rear direction) of the support member 38 having the above-mentioned structure. The vertical rib 46 is provided at the seat width direction center portion of the support member 38, and extends across the neck receiving portion 44, the chest receiving portion 40, and the waist receiving portion 66. The plural horizontal ribs 48 are provided, with a distance therebetween, in the seat height direction, and each crosses the vertical rib 46 at the seat width direction center portion. Further, the horizontal ribs 48, which are provided at the seat height direction upper side portion of the support member 38, each extends across the neck receiving portion 44 and the shoulder receiving portion 42, extends across the chest receiving portion 40 and the shoulder receiving portion 42. The rigidity of the support member 38, particularly, the rigidity of the shoulder receiving portions 42 and the waist receiving portion 66 is ensured by the vertical rib 46 and the horizontal ribs 48. Meanwhile, the vertical rib 46 and the horizontal ribs 48 may be provided so as to correspond to the rigidity that is required for the support member 38, and may be appropriately omitted.

Furthermore, four mounting portions 50, 52, 54, and 68 (see FIG. 2) are provided on the back surface of the support member 38. The mounting portion 50 has a C-shaped cross-section, and is mounted on the back surface (the rear side surface in the seat front and rear direction) of the neck receiving portion 44 so that the axial direction of the mounting portion 50 corresponds to the seat width direction. The seat back upper frame portion 28 is fitted to the mounting portion 50, so that the neck receiving portion 44 is fixed to the seat back upper frame portion 28. Further, the mounting portions 52 and 54 have a C-shaped cross-section, and are mounted on the back surfaces of the shoulder receiving portions 42 so that the axial direction of each of the mounting portions 52 and 54 corresponds to the seat height direction. The side frame upper portions 30 are fitted to the mounting portions 52 and 54, respectively, so that the shoulder receiving portions 42 are fixed to the side frame upper portions 30. Furthermore, the mounting portion 68 has a C-shaped cross-section, and is mounted on the back surface (the rear side surface in the seat front and rear direction) of the waist receiving portion 66 so that the axial direction of the mounting portion 68 corresponds to the seat width direction. The connecting rod 26 is fitted to the mounting portion 68, so that the waist receiving portion 66 is fixed to the connecting rod 26.

Meanwhile, the mounting structure, which mounts the support member 38 to the seat back frame 18, is not limited to the above-mentioned mounting portions 50, 52, 54, and 68. As long as the support member 38 is mounted on the seat back frame 18, various mounting structures (for example, welding, bolts, and the like) well known in the conventional art may be applied. Moreover, the support member 38 and the seat back frame 18 may be connected to each other by elastic bodies such as tension coil springs.

Next, the operation of the seat for vehicle 10 according to the first exemplary embodiment will be described.

Figure 5:
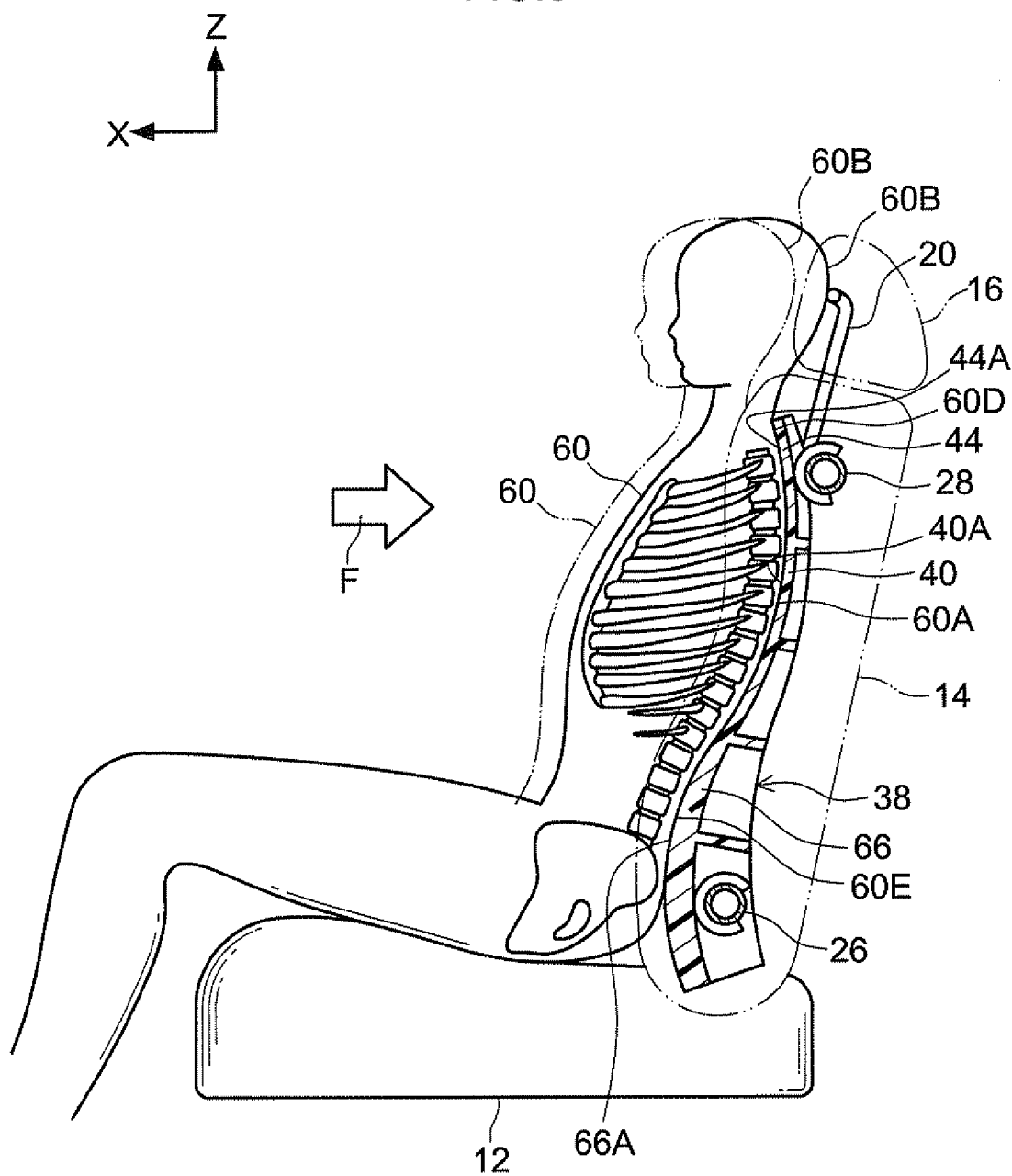
FIG. 5 is a schematic view showing a state where an occupant is seated in the seat for a vehicle according to the first exemplary embodiment of the invention, as seen from the seat width direction outer side.
Figure 6:
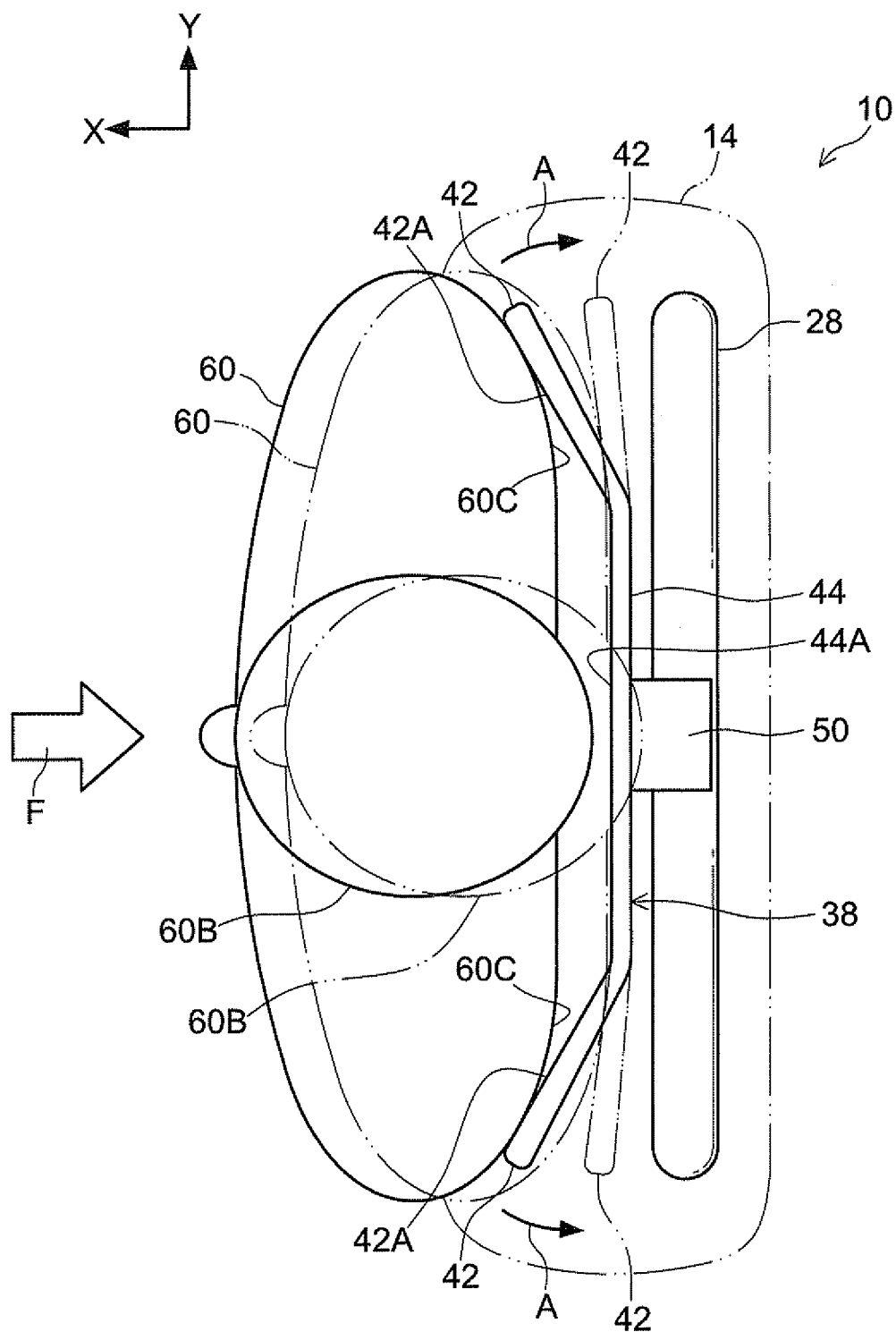
FIG. 6 is a schematic view showing a state where an occupant is seated in the seat for a vehicle according to the first exemplary embodiment of the invention, as seen from the seat height direction upper side.

FIG. 5 schematically shows a state where a load F having a predetermined value or more is applied to an occupant 60 and a head portion 60B, a chest portion 60A, a neck portion 60D, and a waist portion 60E of the occupant are pressed against the headrest 16, the chest receiving portion 40, the neck receiving portion 44, and the waist receiving portion 66 of the support member 38, respectively. Further, FIG. 6 schematically shows a state where shoulder portions 60C of the occupant 60 are pressed against the shoulder receiving portions 42 of the support member 38. Meanwhile, the cervical vertebrae of the occupant are not show in the drawings in FIG. 5.

For example, if a vehicle is collided by another vehicle or the like from the vehicle rear side (collided from behind), a load such as a force of inertia is applied to the occupant 60 seated in the seat for vehicle 10 toward the rear side of the vehicle as shown in FIG. 5 and the occupant 60 is moved toward the rear side in the seat front and rear direction. Accordingly, the back portion of the occupant 60 is pressed against the seat back 14, and the head portion 60B of the occupant 60 is pressed against the headrest 16.

In this case, if the load F applied to the occupant 60 has a predetermined value or more, the occupant 60 is sunk into the seat back 14, and first, the waist portion 60E, which is heavier than the chest portion 60A or the shoulder portions 60C of the occupant 60, is pressed against the waist receiving portion 66. Thereafter, when the shoulder portions 60C of the occupant 60 are pressed against the pressure receiving surfaces 42A of the shoulder receiving portions 42 and further the occupant 60 is moved toward the rear side in the seat front and rear direction as shown in FIG. 6, each of the shoulder receiving portions 42 is deformed about the inner side end portion in the seat width direction of the shoulder receiving portion 42 as a fulcrum toward the rear side in the seat front and rear direction (in the direction of an arrow A) (two-dot chain line in FIG. 6). Further, as shown in FIG. 5, the chest portion 60A and the neck portion 60D of the occupant 60 are pressed against the pressure receiving surface 40A of the chest receiving portion 40 and the pressure receiving surface 44A of the neck receiving portion 44, respectively (full line in FIG. 5).

Here, the pressure receiving surface 40A of the chest receiving portion 40 of the support member 38 is curved to form a convex shape toward the rear side in the seat front and rear direction in side view so as to correspond to the curved shape of the thoracic vertebrae of the occupant 60, and the pressure receiving surface 66A of the waist receiving portion 66 of the support member 38 is curved to form a convex shape toward the front side in the seat front and rear direction in side view so as to correspond to the curved shape of the lumbar vertebrae of the occupant 60. Accordingly, since the concentration of a pressing reaction force on a specific portion of each of the thoracic vertebrae and the lumbar vertebrae of the occupant 60 is suppressed, burdens to the chest portion 60A and the waist portion 60E of the occupant 60 are reduced.

Moreover, since the occupant 60 is held (restrained) on the chest receiving portion 40 and the waist receiving portion 66 in a state where the thoracic vertebrae and the lumbar vertebrae of the occupant 60 are curved, the change of the shape of the thoracic vertebrae and the lumbar vertebrae is suppressed. For this reason, the change of the position of the head portion 60B of the occupant 60 relative to the headrest 16 is suppressed. Accordingly, the difference between a timing when the head portion 60B of the occupant 60 is pressed against the headrest 16 and a timing when the neck portion 60D of the occupant 60 is pressed against the neck receiving portion 44 becomes small, so that swing of the head portion 60B of the occupant about the neck portion 60D as a fulcrum is suppressed. Therefore, a burden to the neck portion 60D of the occupant 60 is reduced.

Figure 7:
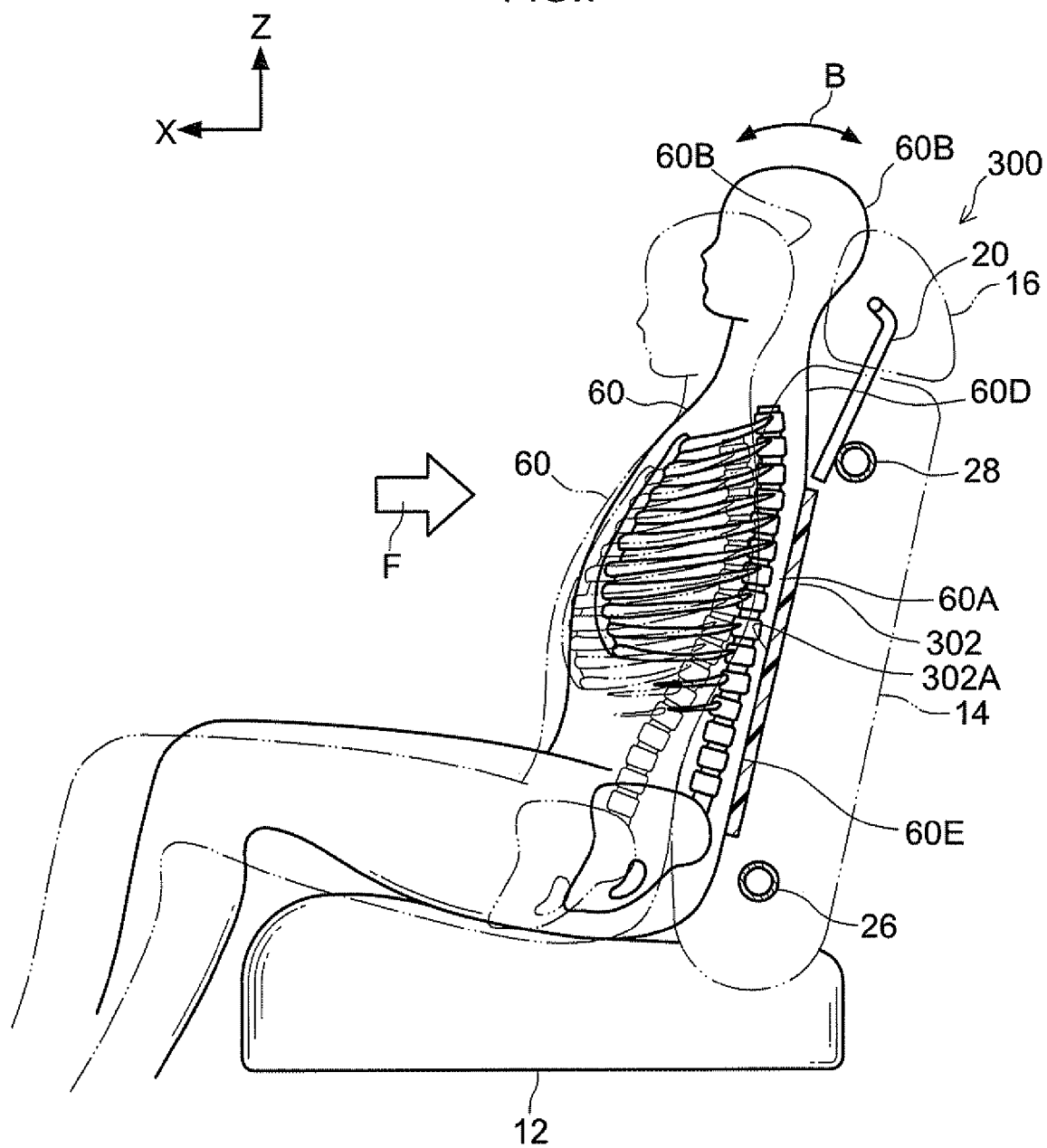
FIG. 7 is a schematic view showing a state where an occupant is seated in a seat for a vehicle according to a comparative example, as seen from the seat width direction outer side.

Here, in comparison with a seat for vehicle 300 according to a comparative example shown in FIG. 7, a support member 302 is formed of a flat plate and a pressure receiving surface 302A, which supports the chest portion 60A and the waist portion 60E of the occupant 60, is formed flat in the seat for vehicle 300. Accordingly, when the waist portion 60E of the occupant 60 is pressed against the support member 302, a pressing reaction force is concentrated on a specific portion of the lumbar vertebrae and the shape of the lumbar vertebrae is changed to a linear shape. Further, when the chest portion 60A of the occupant 60 is pressed against the chest receiving portion of the support member 302, a pressing reaction force is concentrated on a specific portion of the thoracic vertebrae and the shape of the thoracic vertebrae is changed to a linear shape. For this reason, the head portion 60B of the occupant 60 is moved significantly relative to the headrest 16 toward the upper side in the seat height direction. If the position of the head portion 60B of the occupant 60 is changed as in this manner, a timing when the head portion 60B of the occupant 60 is pressed against the headrest 16 and a timing when the neck portion 60D of the occupant is pressed against the neck receiving portion of the support member 302 become different from each other. This causes the head portion 60B of the occupant to swing about the neck portion 60D as a fulcrum in the seat front and rear direction (in the direction of an arrow B).

In contrast, in this exemplary embodiment, as described above, the lumbar vertebrae and the thoracic vertebrae of the occupant 60 are held (restrained) by the waist receiving portion 66 and the chest receiving portion 40 in a state of being curved. For this reason, the change of the shape of the thoracic vertebrae and the lumbar vertebrae is suppressed. Accordingly, the relative position of the headrest 16 and the neck receiving portion 44 is adjusted so that the difference between a timing when the head portion 60B of the occupant 60 is pressed against the headrest 16 and a timing when the neck portion 60D of the occupant 60 is pressed against the neck receiving portion 44 is reduced. As a result, the swing of the head portion 60B of the occupant 60 about the neck portion 60D as a fulcrum in the seat front and rear direction is suppressed. In particular, by that the relative position of the headrest 16 and the neck receiving portion 44 is adjusted so that the head portion 60B and the neck portion 60D of the occupant 60 are simultaneously pressed against (restrained on) the headrest 16 and the neck receiving portion 44, it may be possible to suppress the swing of the head portion 60B of the occupant 60 in the seat front and rear direction. Accordingly, a burden to the neck portion 60D of the occupant 60 is reduced.

Further, in this exemplary embodiment, as shown in FIG. 6, the shoulder portions 60C of the occupant 60 are pressed against the pressure receiving surfaces 42A of the shoulder receiving portions 42 before the neck portion of the occupant 60 is pressed against the pressure receiving surface 44A of the neck receiving portion 44. Accordingly, the movement of the occupant 60 toward the rear side in the seat front and rear direction is suppressed, and a pressing force of the neck portion of the occupant 60 to the pressure receiving surface 44A of the neck receiving portion 44 is reduced. As a result, a pressing reaction force applied to the neck portion of the occupant 60 is reduced. Furthermore, the neck portion of the occupant 60 is supported by the pressure receiving surface 44A of the neck receiving portion 44, so that the contact area between the neck portion of the occupant 60 and the pressure receiving surface 44A of the neck receiving portion 44 is increased. Accordingly, a load applied to the occupant 60 is transmitted in distributed manner to the pressure receiving surface 44A, so that surface pressure is reduced. For this reason, a pressing reaction force applied to the neck portion of the occupant 60 is reduced. Therefore, a burden to the neck portion 60D of the occupant 60 is reduced as compared to a case where the neck portion of the occupant is pressed against the seat back upper frame portion 28 and a pressing reaction force is concentrated on a specific portion of the neck portion 60D of the occupant 60 as in the conventional art (for example, JP-A No. 2009-101137).

Moreover, similar to the neck portion 60D of the occupant 60, the shoulder portions 60C of the occupant 60 are supported by the pressure receiving surfaces 42A of the shoulder receiving portions 42, so that the contact area between the shoulder portions 60C of the occupant 60 and the pressure receiving surfaces 42A of the shoulder receiving portions 42 is increased. Accordingly, a load applied to the occupant 60 is transmitted in distributed manner to the pressure receiving surfaces 42A, so that surface pressure is reduced. For this reason, a pressing reaction force applied to the shoulder portions 60C of the occupant 60 is reduced. Therefore, a burden to the shoulder portions 60C of the occupant 60 is reduced.

Meanwhile, in this exemplary embodiment, the waist receiving portion 66 and the chest receiving portion 40 are curved so as to correspond to the curved shape of the lumbar vertebrae and the thoracic vertebrae of the occupant 60. However, it is possible in the exemplary embodiment as long as that at least the waist receiving portion 66, against which the waist portion 60E is pressed first of all, is curved to form a convex shape toward the front side in the seat front and rear direction in side view so as to correspond to the curved shape of the lumbar vertebrae of the occupant 60. When the shape of the lumbar vertebrae of the occupant 60 is changed, the chest portion 60A of the occupant 60 is moved relative to the chest receiving portion 40 toward the upper side in the seat height direction and a position where the chest portion 60A is pressed against the chest receiving portion 40 is changed, so it is difficult for the occupant to be held in a state of where the thoracic vertebrae is curved.

Next, a modification of the support member of the first exemplary embodiment will be described.

Figure 8:
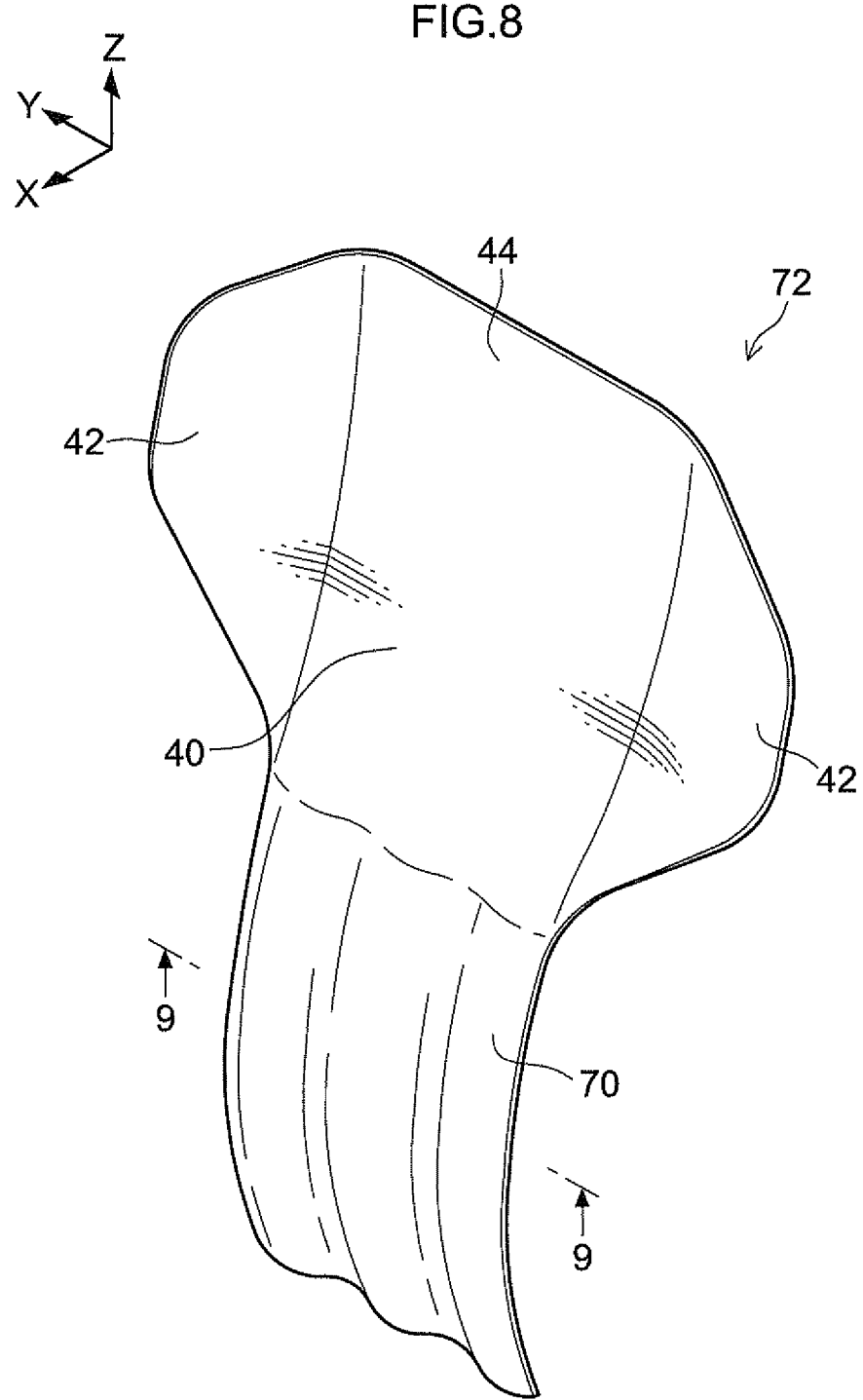
FIG. 8 is a perspective view of a modification of a support member according to the first exemplary embodiment.
Figure 9:
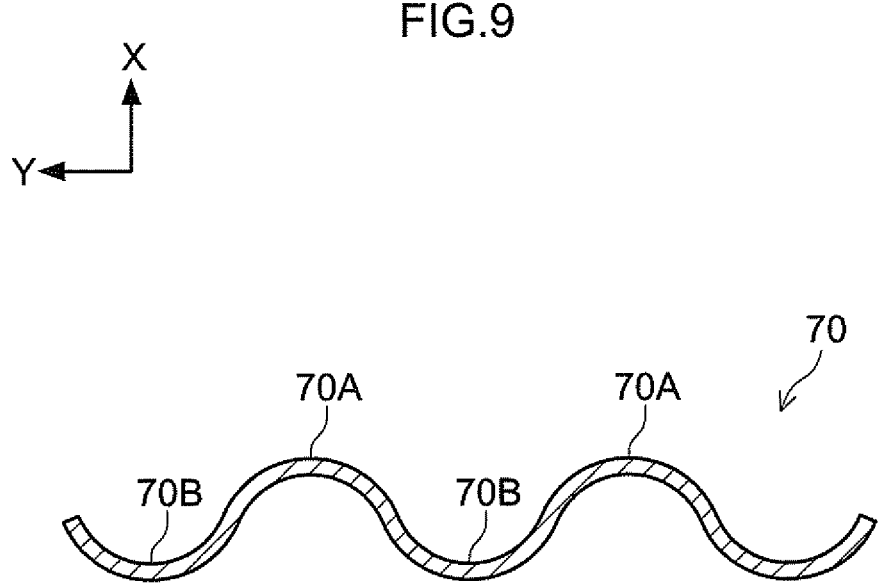
FIG. 9 is a cross-sectional view taken along a line 9-9 of FIG. 8.

An opening portion or a concave portion recessed toward the rear side in the seat front and rear direction may be formed at the waist receiving portion 66 so that the waist receiving portion does not interfere with the lumbar vertebrae of an occupant. For example, a support member 72 including a waist receiving portion 70 is shown in FIG. 8. The waist receiving portion 70 is formed of a corrugated plate or the like. As shown in FIG. 9, the waist receiving portion 70 includes plural convex portions 70A that protrude toward the front side in the seat front and rear direction, and plural concave portions 70B that are recessed toward the rear side in the seat front and rear direction. These convex and concave portions 70A and 70N are alternately disposed in the seat width direction. Accordingly, the cross-section of the waist receiving portion 70 seen in the seat height direction has a corrugated shape. When the waist portion of an occupant is pressed against the waist receiving portion 70, the lumbar vertebrae of the occupant are fitted to the concave portion 70B, which is formed at the center portion in the seat width direction of the waist receiving portion 70. Accordingly, the waist receiving portion 70 does not interfere with the lumbar vertebrae of the occupant.

Since the concave portion 70B is formed at the center portion in the seat width direction of the waist receiving portion 70, that is, formed at the position corresponding to the lumbar vertebrae of the occupant as described above, a pressing reaction force to the lumbar vertebrae of an occupant is reduced and the change of the shape of the lumbar vertebrae is further suppressed. Further, since the waist receiving portion 70 is formed in a corrugated shape, the rigidity of the waist receiving portion 70 is larger than that of other portion (for example, the chest receiving portion 40). Since the rigidity of the waist receiving portion 70 is increased due to the mechanical property caused by a corrugated shape as described above, it is possible to reduce material costs as compared to a structure where the thickness or the like of the waist receiving portion 70 is increased.

Meanwhile, the waist receiving portion 70 of the support member 72 is formed in a corrugated shape in the structure shown in FIG. 8, but the chest receiving portion 40 may be formed in a corrugated shape. Further, an opening portion or a concave portion recessed toward the rear side in the seat front and rear direction may be formed at the chest receiving portion 40 so that the chest receiving portion 40 does not interfere with the thoracic vertebrae of an occupant. Accordingly, it may also be possible to suppress the change of the shape of thoracic vertebrae.

Furthermore, the support member 38 is provided with the shoulder receiving portions 42 (see FIG. 1) in the first exemplary embodiment, but the shoulder receiving portions 42 may be appropriately omitted. A support member 74 from which the shoulder receiving portions 42 are omitted will be described below. Meanwhile, a modification of the neck receiving portion and a shock absorber will be described together.

Figure 10:
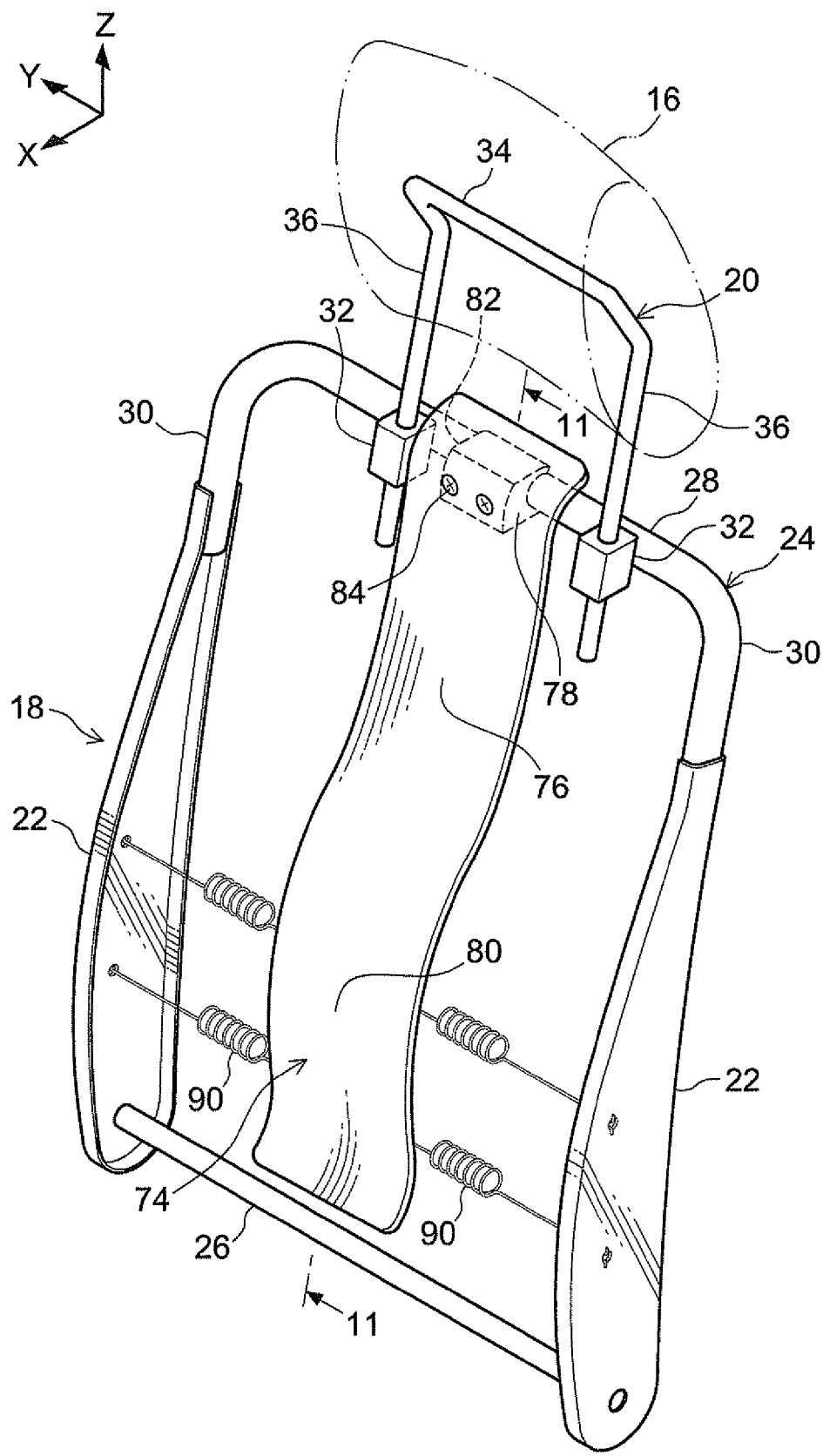
FIG. 10 is a perspective view of a modification of the seat back for a vehicle according to the first exemplary embodiment of the invention.
Figure 11:
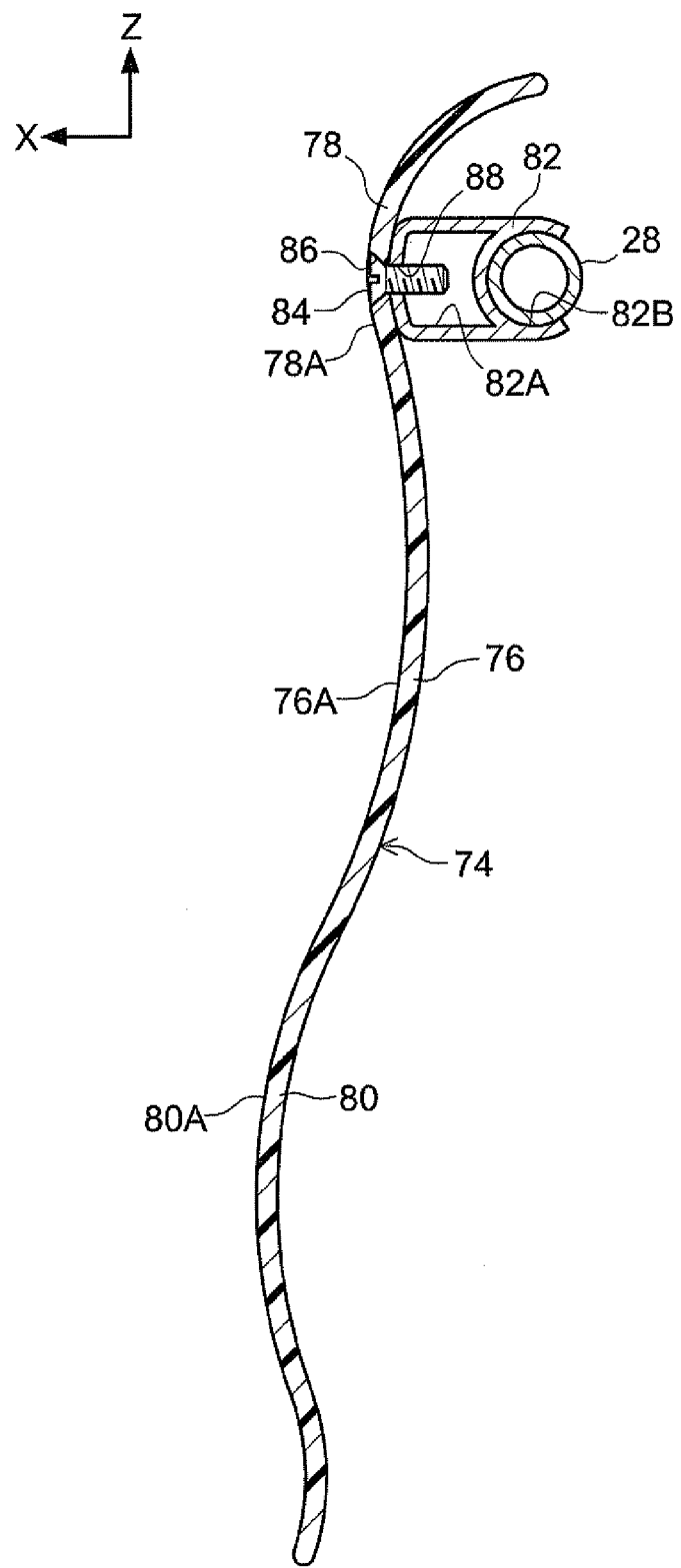
FIG. 11 is a cross-sectional view taken along a line 11-11 of FIG. 10.

As shown in FIGS. 10 and 11, the support member 74 includes a chest receiving portion 76, a neck receiving portion 78 that is provided on the seat height direction upper side of the chest receiving portion 76, and a waist receiving portion 80 that is provided on the seat height direction lower side of the chest receiving portion 76. The neck receiving portion 78 extends toward the seat height direction upper side from the chest receiving portion 76, and covers the seat back upper frame portion 28. Further, the surface (the front side surface in the seat front and rear direction) of the neck receiving portion 78 forms a pressure receiving surface 78A (see FIG. 11) that supports the neck portion of an occupant. The pressure receiving surface 78A is curved to form a convex shape toward the front side in the seat front and rear direction so as to correspond to the curved shape of the cervical vertebrae of an occupant. Accordingly, when the neck portion of an occupant is pressed against the pressure receiving surface 78A, a pressing reaction force is not concentrated on a specific portion of the cervical vertebrae.

As shown in FIG. 11, a mounting portion 82 as a shock absorber is provided on the back surface (the rear side surface in the seat front and rear direction) of the neck receiving portion 78. The mounting portion 82 is made of aluminum, mild steel, or the like, and a hollow portion 82A is formed in the mounting portion 82. The rigidity of the mounting portion 82 is reduced due to the hollow portion 82A. Accordingly, if a load having a predetermined value or more is applied to the mounting portion 82, the mounting portion 82 is crushed, so that collision energy is absorbed.

Meanwhile, the hollow portion 82A may be filled with low-repulsion urethane, foamed plastic, or the like.

Screw holes 88, which communicate with the hollow portion 82A, are formed at the front side end portion in the seat front and rear direction of the mounting portion 82. Tap screws 84 are fastened to the screw holes 88 through through holes 86 formed at the neck receiving portion 78, so that the mounting portion 82 is fixed to the neck receiving portion 78. Meanwhile, the heads of the tap screws 84 are received in counterbores formed at the neck receiving portion 78, so that the heads of the tap screws 84 do not protrude from the pressure receiving surface 78A of the neck receiving portion 78.

Further, an opening portion 82B, which has a C-shaped cross-section, is formed at the rear side end portion in the seat front and rear direction of the mounting portion 82. The seat back upper frame portion 28 is fitted to the opening portion 82B, so that the neck receiving portion 78 is fixed to the seat back upper frame portion 28.

Similar to the pressure receiving surface 78A of the neck receiving portion 78, a pressure receiving surface 76A of the chest receiving portion 76 is curved to form a convex shape toward the rear side in the seat front and rear direction in side view so as to correspond to the curved shape of the thoracic vertebrae of an occupant, and a pressure receiving surface 80A of the waist receiving portion 80 is curved to form a convex shape toward the front side in the seat front and rear direction in side view so as to correspond to the curved shape of the lumbar vertebrae of an occupant. That is, unevenness (convex and concave) is formed on the surface of the support member 74 so as to correspond to the curved shape of the vertebrae (cervical vertebrae, thoracic vertebrae, and lumbar vertebrae) of an occupant. Further, the waist receiving portion 80 is connected to the seat back side frames 22 by tension coil springs (seat back springs) 90 (see FIG. 10) as elastic members. The occupant feels comfortable to sit on the seat for vehicle by the elastic deformation of the tension coil springs 90.

Here, when a load having a predetermined value or more is applied to an occupant, the neck portion of the occupant is pressed against the neck receiving portion 78. However, the neck portion of the occupant is supported by the pressure receiving surface 78A of the neck receiving portion 78, so that the contact area between the neck portion of the occupant and the pressure receiving surface 78A of the neck receiving portion 78 is increased. Accordingly, a load applied to the occupant is transmitted in distributed manner to the pressure receiving surface 78A, so that surface pressure is reduced. For this reason, a pressing reaction force applied to the neck portion of the occupant is reduced. Therefore, even though the shoulder receiving portions 42 are omitted, a burden to the neck portion of the occupant is reduced as compared to a case where the neck portion of the occupant is pressed against the seat back upper frame portion 28 such as in the conventional art (for example, JP-A No. 2009-101137). Further, since the shoulder receiving portions 42 are omitted, it may be possible to reduce the weight or material costs of the support member 74.

Furthermore, in this modification, the pressure receiving surface 78A of the neck receiving portion 78 is curved to form a convex shape toward the front side in the seat front and rear direction in side view so as to correspond to the curved shape of the cervical vertebrae of an occupant. Accordingly, the concentration of a pressing reaction force on a specific portion of the cervical vertebrae of the occupant is suppressed. Therefore, a burden to the neck portion of the occupant is reduced.

In addition, in this modification, the mounting portion 82 as the shock absorber is provided between the neck receiving portion 78 and the seat back upper frame portion 28. Accordingly, if a load having a predetermined value or more is applied to the neck receiving portion 78, the mounting portion 82 is crushed, so that collision energy is absorbed. Therefore, a burden to the neck portion of the occupant is further reduced. Meanwhile, an elastic body, such as silicon, a viscoelastic body, or a spring, may be used as the shock absorber.

Next, the structure of a seat for vehicle 100 according to a second exemplary embodiment will be described. Meanwhile, the same components as those of the first exemplary embodiment are denoted by the same reference numerals and the description thereof will be appropriately omitted.

Figure 12:
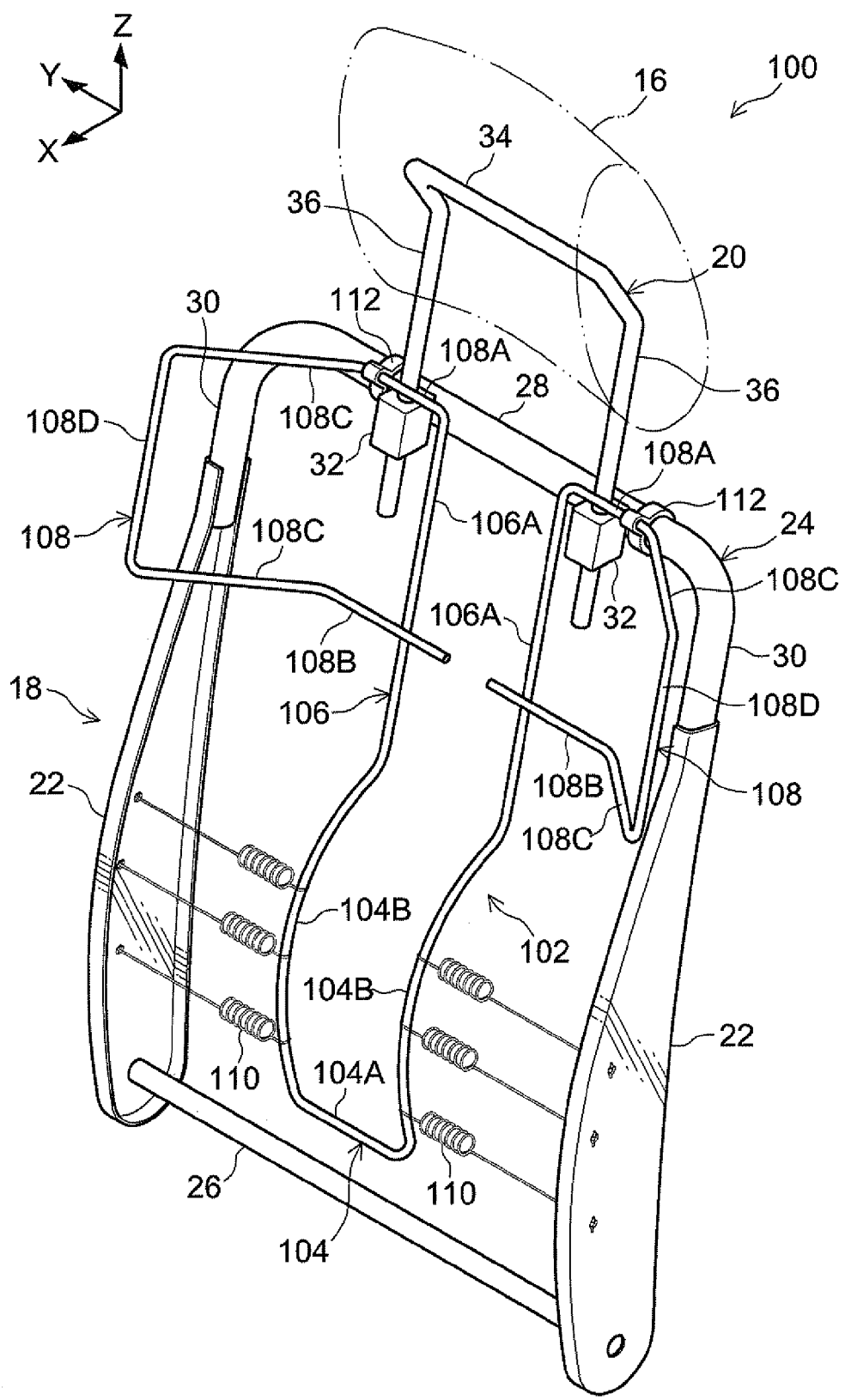
FIG. 12 is a perspective view of a seat back for a vehicle according to a second exemplary embodiment of the invention.

A seat back frame 18 of the seat for vehicle 100 according to the second exemplary embodiment is shown in FIG. 12. In the second exemplary embodiment, a support member 102 mounted on the seat back frame 18 is formed of a wire frame that is formed by bending one wire or connecting plural wires. The support member 102 includes a waist receiving frame portion 104 as a waist receiving portion, a chest receiving frame portion 106 as a chest receiving portion, and shoulder receiving frame portions 108 as shoulder receiving portions.

The waist receiving frame portion 104 is formed by bending a wire in a U shape. The waist receiving frame portion 104 includes a horizontal wire 104A that extends in the seat width direction, and a pair of vertical wires 104B that extend toward the seat height direction upper side from the both side end portions in the seat width direction of the horizontal wire 104A. The waist receiving frame portion 104 is disposed between the seat back side frames 22. The vertical wires 104B are disposed at positions that correspond to both left and right side portions of the lumbar vertebrae of an occupant, and when a load having a predetermined value or more is applied to an occupant, the waist portion of the occupant is pressed against. Further, the pair of vertical wires 104B is curved to form a convex shape toward the front side in the seat front and rear direction in side view so as to correspond to the curved shape of the lumbar vertebrae of an occupant. Accordingly, when the waist portion of an occupant is pressed against the pair of vertical wires 104B, the change of the shape of the lumbar vertebrae is suppressed. Furthermore, the pair, that is, the vertical wires 104B are connected to the seat back side frames 22 by tension coil springs (seat back springs) 110 as elastic members. The occupant feels comfortable to sit on the seat for vehicle by the elastic deformation of the tension coil springs 110.

The chest receiving frame portion 106 includes a pair of vertical wires 106A that extends toward the upper side in the seat height direction from end portions at the upper side in the seat height direction of the vertical wires 104B of the waist receiving frame portion 104. These vertical wires 106A are disposed at positions that correspond to both left and right side portions of the thoracic vertebrae of an occupant, and when a load having a predetermined value or more is applied to an occupant, the chest portion of the occupant is pressed against.

Each of the shoulder receiving frame portions 108 is formed by bending a wire in a U shape. The shoulder receiving frame portions 108 are disposed at positions that correspond to the peripheral portions of the shoulder blades of an occupant, respectively. Each of the shoulder receiving frame portions 108 includes an upper side horizontal wire 108A and a lower side horizontal wire 108B. The upper side horizontal wire 108A extends toward the outer side in the seat width direction from the end portion at the upper side in the seat height direction of the vertical wire 106A of the chest receiving frame portion 106. The lower side horizontal wire 108B is disposed on the seat height direction lower side of the upper side horizontal wire 108A, extends in the seat width direction, and crosses the vertical wire 106A of the chest receiving frame portion 106. Mounting portions 112 having a C-shaped cross-section are mounted on the upper side horizontal wires 108A. The seat back upper frame portion 28 is fitted to the mounting portions 112, so that the support member 102 is fixed to the seat back upper frame portion 28.

Further, pairs of inclined wires 108C are provided at the both end portions at the outer side in the seat width direction of the upper and lower side horizontal wires 108A and 108B. That is, the inclined wires 108C in each pair extend toward the outer side in the seat width direction from the end portion in the scat width direction of the upper side horizontal wire 108A and the end portion in the seat width direction of the lower side horizontal wire 108B. These inclined wires 108C are inclined with respect to the upper and lower side horizontal wires 108A and 108E toward the front side in the seat front and rear direction by a predetermined inclination angle, so they are disposed at the front side in the seat front and rear direction further than the seat back upper frame portion 28. Further, in each pair, end portions at the outer side in the seat width direction of the inclined wires 108C are connected to a vertical wire 108D that extends in the seat height direction.

Since the support member 102 is formed of a wire frame as described above, it is possible to reduce the weight of the support member and to reduce the material costs of the support member.

Figure 13:
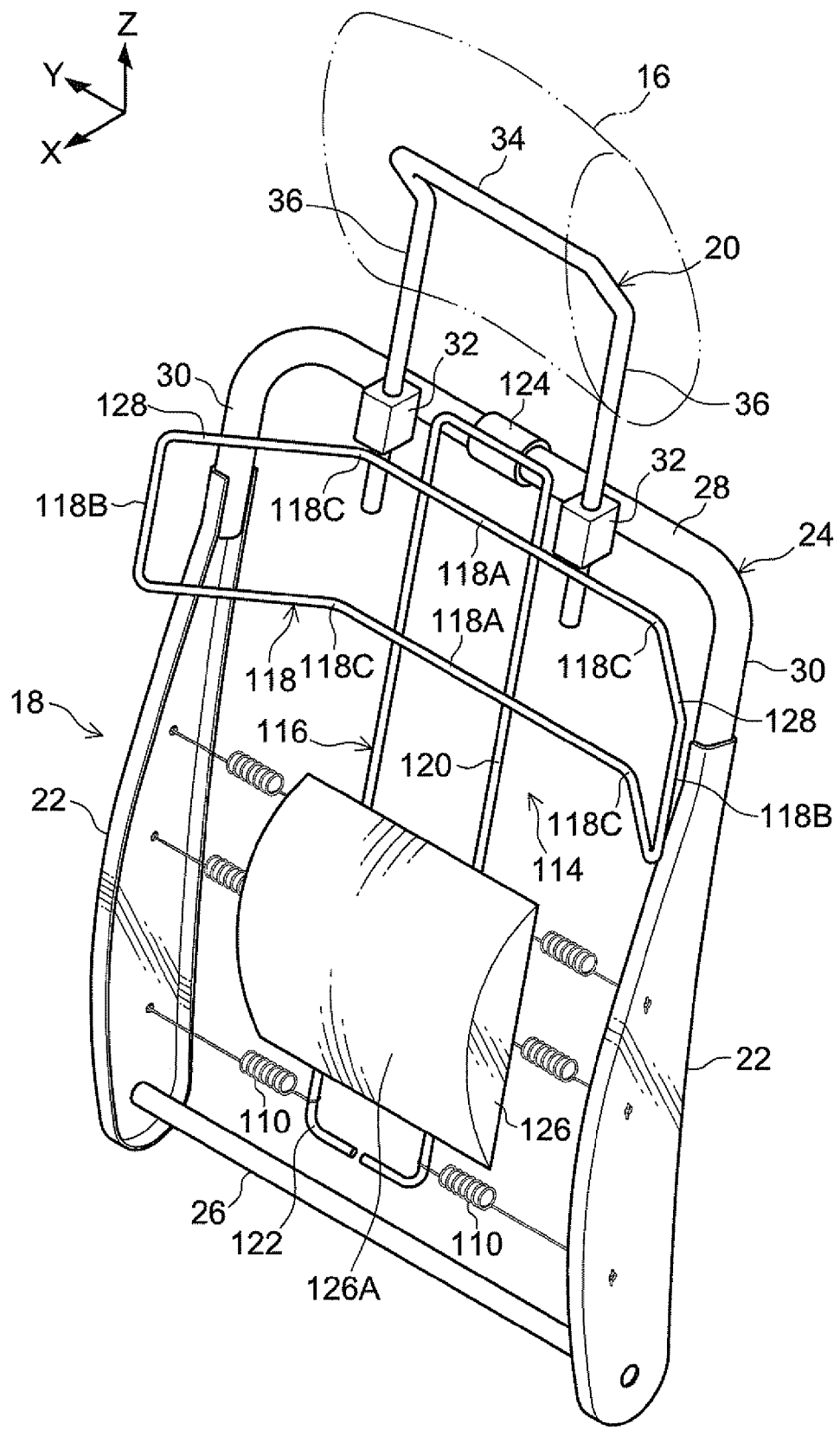
FIG. 13 is a perspective view of a modification of the seat back for a vehicle according to the second exemplary embodiment of the invention.

Meanwhile, panel members may be provided on the waist receiving frame portion 104, the chest receiving frame portion 106, and the shoulder receiving frame portions 108 of the support member 102 so that the respective portions of an occupant are supported by surfaces. Further, the support member 102 may be provided with a neck receiving portion. Furthermore, the support member 102 is formed of one wire frame in the structure shown in FIG. 12. However, as shown in FIG. 13, a support member 114 may be formed using the combination of plural wire frames. Specifically, the support member 114 includes two wire frames 116 and 118.

The wire frame 116 is formed by bending a wire in the shape of a substantially rectangular loop, and is disposed between the seat back side frames 22 so that the longitudinal direction of the wire frame 116 corresponds to the seat height direction. The upper side portion in the seat height direction of the wire frame 116 forms a chest receiving frame portion 120, and the lower side portion in the seat height direction of the wire frame 116 forms a waist receiving frame portion 122.

A mounting portion 124 having a C-shaped cross-section is mounted on the end portion at the upper side in the seat height direction of the chest receiving frame portion 120. The seat back upper frame portion 28 is fitted to the mounting portion 124, so that the support member 114 is fixed to the seat back upper frame portion 28.

A pressure receiving member 126 is provided at the front side in the seat front and rear direction of the waist receiving frame portion 122. The pressure receiving member 126 has a pressure receiving surface 126A that is curved to form a convex shape toward the front side in the seat front and rear direction in side view so as to correspond to the curved shape of the lumbar vertebrae of an occupant. Accordingly, when the waist portion of an occupant is pressed against the pressure receiving surface 126A, a pressing reaction force is not concentrated on a specific portion of the lumbar vertebrae.

The wire frame 118 is mounted on a portion at the upper side in the seat height direction of the wire frame 116 by welding or the like. The wire frame 118 is formed by bending a wire in the shape of a substantially rectangular loop. The wire frame 118 includes a pair of horizontal wires 118A that extends in the seat width direction, and a pair of vertical wires 11SB that extends in the seat height direction. The wire frame 118 is disposed so that the longitudinal direction of the wire frame 118 corresponds to the seat width direction. The horizontal wires 118A each is bent at bent portions 118C that are disposed at the outer side portions in the seat width direction of the horizontal wire, and end portions at the outer side in the seat width direction of the horizontal wires 118A are disposed at the front side in the seat front and rear direction further than the seat back upper frame portion 28. The portions at the outer side in the seat width direction of the wire frames 118 further than the bent portions 118C form shoulder receiving frame portions 128 as shoulder receiving portions.

Since the support member 102 is formed by the combination of the two wire frames 116 and 118 as described above, the structure of the support member 102 is simplified. Accordingly, it is possible to reduce the manufacturing costs of the support member 102.

The first and second exemplary embodiments of the invention have been described above. However, the invention is not limited to these exemplary embodiments, and the first and second exemplary embodiments may be combined with each other. Further, it goes without saying that the invention may have various modifications without departing from the scope of the invention.

What is claimed is:

1. A seat back for a vehicle comprising:
    a seat back frame, including:
        a pair of seat back side frame portions, the seat back side frame portions being disposed respectively at both sides in a seat width direction and each of the seat back side frame portions extending in a seat height direction, and
        a seat back upper frame portion which connects upper end portions of the pair of seat back side frame portions along the seat width direction and on which a headrest is mounted;
    a support member that is mounted on the seat back frame; and
    a waist receiving portion that is provided at the support member, the waist receiving portion being curved to form a convex shape toward a front side in a seat front-rear direction in side view, and supporting a waist portion of an occupant when a load having a predetermined value or more is applied to the occupant toward a rear side in the seat front-rear direction, wherein
    the waist receiving portion includes a corrugated shape portion whose cross-section, in a seat-width direction, is a corrugated shape, and
    the corrugated shape comprises alternating concave and convex recesses in the seat-width direction.

2. The seat back for a vehicle of claim 1, further comprising a chest receiving portion that is provided at the support member, the chest receiving portion being curved to form a convex shape toward the rear side in the seat front-rear direction in side view, and supporting a chest portion of an occupant when a load having a predetermined value or more is applied to the occupant toward the rear side in the seat front-rear direction.

3. The seat back for a vehicle of claim 2, further comprising a neck receiving portion that is provided at the support member, the neck receiving portion being arranged at the front side in the seat front-rear direction of the seat back upper frame portion, and supporting a neck portion of an occupant when a load having a predetermined value or more is applied to the occupant toward the rear side in the seat front-rear direction.

4. The seat back for a vehicle of claim 3, further comprising shoulder receiving portions that are provided at the support member, the shoulder receiving portions being arranged respectively at both sides in the seat width direction of the chest receiving portion and also at the front side in the seat front-rear direction of the chest receiving portion, and the shoulder receiving portions supporting shoulder portions of the occupant when a load having a predetermined value or more is applied to the occupant toward the rear side in the seat front-rear direction.

5. The seat back for a vehicle of claim 1, wherein the waist receiving portion includes a concave portion which is recessed toward the rear side in the seat front-rear direction from the waist receiving portion, a lumbar vertebrae of the occupant being disposed in the concave portion when a load having a predetermined value or more is applied to the occupant toward the rear side in the seat front-rear direction.

6. A seat for a vehicle comprising:
    a seat cushion;
    a seat back for a vehicle including:

a seat back frame including a pair of seat back side frame portions, the seat back side frame portions being disposed respectively at both sides in a seat width direction and each of the seat back side frame portions extending in a seat height direction, and a seat back upper frame portion which connects upper end portions of the pair of seat back side frame portions along the seat width direction and on which a headrest is mounted;

a support member that is mounted on the seat back frame;

a waist receiving portion that is provided at the support member, the waist receiving portion being curved to form a convex shape toward a front side in a seat front-rear direction in side view, and supporting a waist portion of an occupant when a load having a predetermined value or more is applied to the occupant toward a rear side in the seat front-rear direction, which is mounted on an end portion at the rear side in the seat front-rear direction of the seat cushion; and a headrest that is mounted on the seat back upper frame portion of the seat back for a vehicle, wherein the waist receiving portion includes a corrugated shape portion whose cross-section, in a seat-width direction, is a corrugated shape, and the corrugated shape comprises alternating concave and convex recesses in the seat-width direction.

7. The seat for a vehicle of claim 6, further comprising a chest receiving portion that is provided at the support member, the chest receiving portion being curved to form a convex shape toward the rear side in the seat front-rear direction in side view, and supporting a chest portion of an occupant when a load having a predetermined value or more is applied to the occupant toward the rear side in the seat front-rear direction.

8. The seat for a vehicle of claim 7, further comprising a neck receiving portion that is provided at the support member, the neck receiving portion being arranged at the front side in the seat front-rear direction of the seat back upper frame portion, and supporting a neck portion of an occupant when a load having a predetermined value or more is applied to the occupant toward the rear side in the seat front-rear direction.

9. The seat for a vehicle of claim 8, further comprising shoulder receiving portions that are provided at the support member, the shoulder receiving portions being arranged respectively at both sides in the seat width direction of the chest receiving portion and also at the front side in the seat front-rear direction of the chest receiving portion, and the shoulder receiving portions supporting shoulder portions of the occupant when a load having a predetermined value or more is applied to the occupant toward the rear side in the seat front-rear direction.

10. The seat for a vehicle of claim 6, wherein the waist receiving portion includes a concave portion which is recessed toward the rear side in the seat front-rear direction from the waist receiving portion, a lumbar vertebrae of the occupant being disposed in the concave portion when a load having a predetermined value or more is applied to the occupant toward the rear side in the seat front-rear direction.

* * * * *